(12) United States Patent
James

(10) Patent No.: US 11,291,333 B2
(45) Date of Patent: Apr. 5, 2022

(54) HEAT AND FLAME CONTROL

(71) Applicant: Dansons US, LLC, Phoenix, AZ (US)

(72) Inventor: Chris James, Phoenix, AZ (US)

(73) Assignee: Dansons US, LLC, Phoenix, AZ (US)

( * ) Notice: Subject to any disclaimer, the term of this patent is extended or adjusted under 35 U.S.C. 154(b) by 102 days.

(21) Appl. No.: 16/672,002

(22) Filed: Nov. 1, 2019

(65) Prior Publication Data

US 2021/0127899 A1 May 6, 2021

(51) Int. Cl.
| | | |
|---|---|---|
| *A47J 37/07* | (2006.01) | |
| *F24B 1/193* | (2006.01) | |
| *F24B 1/195* | (2006.01) | |
| *F24B 1/189* | (2006.01) | |

(52) U.S. Cl.
CPC ........... *A47J 37/0786* (2013.01); *F24B 1/193* (2013.01); *F24B 1/195* (2013.01); *A47J 37/0704* (2013.01)

(58) Field of Classification Search
CPC ... A47J 37/0786; A47J 37/0704; F24B 1/193; F24B 1/195
See application file for complete search history.

(56) References Cited

U.S. PATENT DOCUMENTS

| | | | | |
|---|---|---|---|---|
| 929,713 | A * | 8/1909 | Salter | F24B 1/1895 126/538 |
| 1,403,054 | A * | 1/1922 | Nabers | E06B 7/084 49/104 |
| 1,979,889 | A * | 11/1934 | Lange | F24B 5/02 126/58 |
| 2,557,213 | A * | 6/1951 | Artis | F24F 13/1413 126/286 |
| 2,959,884 | A | 11/1960 | Lemay | |
| 3,316,004 | A * | 4/1967 | Wilhelm | E05C 17/20 292/267 |
| 4,305,377 | A * | 12/1981 | Shull | F24B 1/1895 126/539 |
| 4,374,515 | A | 2/1983 | Conrad | |
| 4,436,081 | A * | 3/1984 | Hefling | A47J 37/0704 126/146 |

(Continued)

FOREIGN PATENT DOCUMENTS

| | | | |
|---|---|---|---|
| CN | 105091034 B | * 12/2017 | |
| GB | 191211483 A | * 2/1913 | ............ F24B 1/1957 |

OTHER PUBLICATIONS

PCT Search Report and Written Opinion for Application No. PCT/US20/58470 dated Mar. 18, 2021, 8 pages.

(Continued)

*Primary Examiner* — Jorge A Pereiro
*Assistant Examiner* — Logan P Jones
(74) *Attorney, Agent, or Firm* — Seyfarth Shaw LLP

(57) ABSTRACT

A heat and flame control assembly for a grill or other cooking appliance. The heat and flame control assembly includes a main heat plate and a slider plate disposed above the main heat plate. The main heat plate includes openings that allow direct heat to be provided to the food. The slider plate is movable with respect to the main heat plate, and also includes opening. When direct heat is desired, the slider plate is movable to align the openings in the slider plate with the openings of the main heat plate. However, when indirect heat is desired, the slider plate is movable to cover the openings of the main heat plate.

15 Claims, 3 Drawing Sheets

(56) References Cited

U.S. PATENT DOCUMENTS

| | | | |
|---|---|---|---|
| 4,494,525 A | 1/1985 | Albertsen | |
| 6,314,868 B1 * | 11/2001 | Christensen | A47J 37/0713 126/25 R |
| 7,241,466 B2 * | 7/2007 | Dellinger | A47J 37/0713 426/523 |
| 9,186,020 B1 * | 11/2015 | Phillips | A47J 37/0709 |
| 2004/0094142 A1 * | 5/2004 | Christensen | A47J 37/067 126/41 R |
| 2007/0147061 A1 * | 6/2007 | Lee | F21S 41/43 362/513 |
| 2013/0167824 A1 * | 7/2013 | Calinawan | A47J 37/0704 126/25 R |
| 2013/0298894 A1 * | 11/2013 | Kleinsasser | A47J 37/0704 126/25 R |
| 2013/0314924 A1 * | 11/2013 | Lee | F21S 41/689 362/284 |
| 2016/0037969 A1 * | 2/2016 | Renner | A47J 37/0786 99/445 |
| 2018/0368618 A1 * | 12/2018 | Measom | A23B 4/052 |

OTHER PUBLICATIONS

James&Movlogs. "Pit Boss Pro Series Product Review", Youtube. [online]. Jan. 3, 2019; <URL: https://www.youtube.com/watch?v=eHsXou9MdJ8>; 6 pages.

* cited by examiner

HEAT AND FLAME CONTROL

TECHNICAL FIELD OF THE INVENTION

The presently disclosed embodiments relate generally to grills and smokers. More particularly, the presently disclosed embodiments relate to devices and methods for controlling an amount of heat and flame in the grills and smokers.

BACKGROUND OF THE INVENTION

Grills are a common outdoor cooking appliance that burn fuel to cook food within a cook chamber, and provide flavor during the cooking process that is difficult to obtain using a conventional indoor cooking appliance. Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid going above the desired temperature, similar to a thermostat system.

Pellet grills and smokers typically include a burn pot assembly located at a bottom and center area of the appliance that directs heat, flame, and smoke upward. In some cases, indirect heat is desired, while in other cases, direct heat and flame is desired. For example, direct heat and a larger amount of flame may be desired when searing meat. However, some of these appliances struggle to allow a user to control the amount of heat and flame emanating from the burn pot assembly.

SUMMARY OF THE INVENTION

The presently disclosed embodiments include a heat and flame control assembly for a grill or other cooking appliance. The heat and flame control assembly includes a main heat plate and a slider plate disposed above the main heat plate. The main heat plate includes openings or slits that allow direct heat to be provided to the food. The slider plate is movable with respect to the main heat plate, and also includes opening or slits. When direct heat is desired, the slider plate is movable to align the openings in the slider plate with the openings of the main heat plate. However, when indirect heat is desired, the slider plate is movable to cover the openings of the main heat plate. Additionally, the amount of direct heat and/or flame can be controlled by moving the slider plate to partially align the openings in the slider plate with the openings of the main heat plate.

In particular, the presently disclosed embodiments include a heat and flame control assembly. The heat and flame control assembly includes a main heat plate including first openings and adapted to be disposed above a burn pot of an appliance. A slider plate is disposed on the main heat plate and adapted to be moved with respect to the main heat plate to open and close the first openings. A latch is coupled to the slider plate and movable between latched and unlatched positions. A control lever is coupled to the slider plate by the latch when the latch is disposed in the latched state. Movement of the control lever moves the slider plate with respect to the main heat plate to open and close the first openings.

The presently disclosed embodiments further include a grill or other cooking appliance incorporating a heat and flame control assembly.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
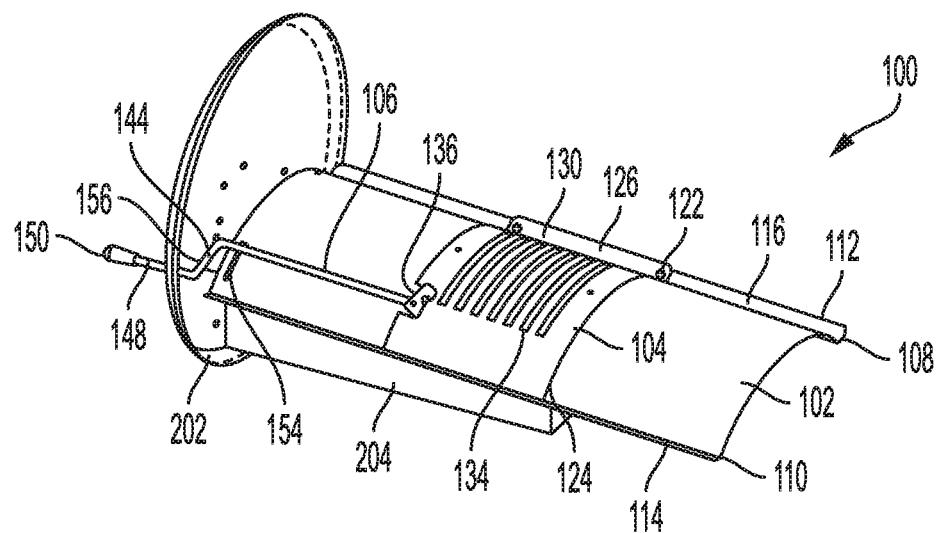
FIG. 1 is a perspective view of a heat and flame control assembly according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include an outdoor cooking appliance such as a pellet grill with a heat and flame control assembly. In general, the grill includes a cooking chamber (also referred to as a main barrel), a hopper assembly coupled to the cooking chamber, a burn pot disposed in the cooking chamber proximal to a bottom of the cooking chamber, the heat and flame control assembly disposed above the burn pot, and one or more cooking grates or racks disposed in the cooking chamber above the burn pot and heat and flame control assembly. The grill generally functions by feeding wood pellets that are disposed in the hopper assembly into the burn pot using an auger of the hopper assembly. The pellets are ignited via combustion and produce heat and flames that cook food disposed on the cooking grates.

The heat and flame control assembly includes a main heat plate disposed above the burn pot and a slider plate disposed above the main heat plate. The main heat plate includes openings or slits that allow direct heat to be provided to the food. The slider plate is movable with respect to the main heat plate, and also includes opening or slits. When direct heat is desired, the slider plate is movable to align the openings in the slider plate with the openings of the main heat plate. However, when indirect heat is desired, the slider plate is movable to cover the openings of the main heat plate. Additionally, the amount of direct heat and/or flame can be controlled by moving the slider plate to partially align the openings in the slider plate with the openings of the main heat plate. Described another way, the slider plate may be moved to partially cover the openings of the main heat plate.

Referring to FIGS. 1-5, a heat and flame control assembly 100 for a grill is illustrated. As illustrated, the heat and flame control assembly 100 includes a main heat plate 102, a slider plate 104 disposed on the main heat plate 102, and a control lever or handle 106 operably coupled to the slider plate 104.

As illustrated, the main heat plate 102 is an elongated body that has a curved cross-sectional shape. However, the main heat plate 102 may have other cross sectional shapes, such as straight, triangular, rectangular, or other polygonal type cross-sectional shapes. The main heat plate 102 includes first and second opposing sides 108, 110. A first flange 112 extends from the first side 108, and a second flange 114 extends from the second side 110. The first and second flanges 112, 114 extend at an angle (such as about 10-90 degrees) with respect to the respective first and second sides 108, 110 to form a respective first and second valleys 116, 118. For example, the first and second flanges 112, 114 and respective first and second sides 108, 110 form a substantially "V" type shape.

Figure 2:
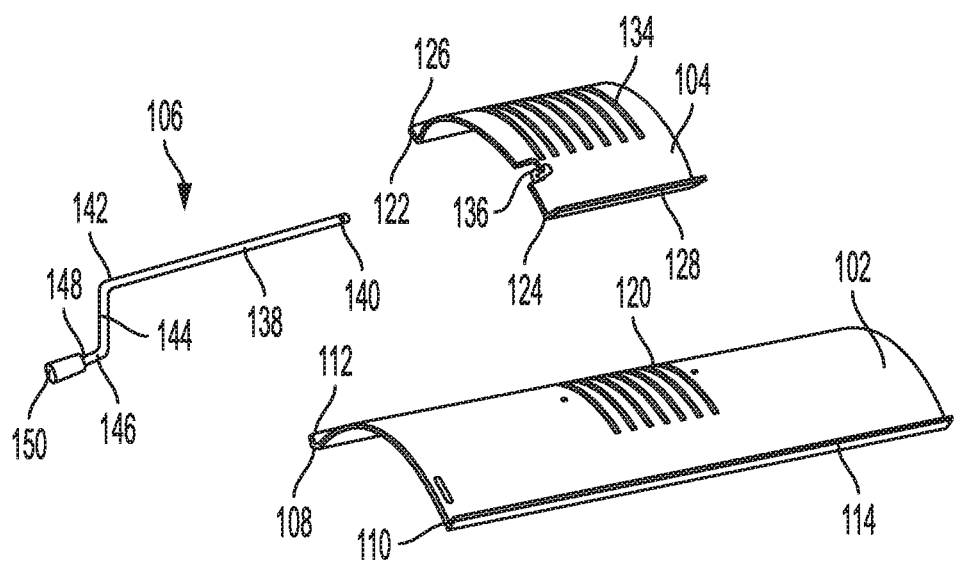
FIG. 2 is an exploded view of the heat and flame control assembly according to at least one of the presently disclosed embodiments.

The main heat plate 102 may also include one or more first openings or slits 120 in the elongated body (as best shown in FIG. 2). As illustrated, there are seven equally spaced openings 120 extending transversely or in a side to side direction proximal to a central top portion of the elongated body of the main heat plate 102. However, the orientation and number of the openings 120 may be varied based on the application. For example, the number of openings 120 may be more or less than seven, and the orientation of the openings 120 may be angled, longitudinal, etc. with respect to the elongated body of the main heat plate 102.

The slider plate 104 is adapted to be disposed on and movable or slidable with respect to the main heat plate 102. Similar to the main heat plate 102, the slider plate 104 includes an elongated body that has a curved cross-sectional shape. However, the slider plate 104 can have a length shorter or smaller than a length of the main heat plate 102. Additionally, the slider plate 104 may have other cross sectional shapes, such as straight, triangular, rectangular, or other polygonal type cross-sectional shapes, as long as the shape of the slider plate 104 corresponds to the shape of the main heat plate 102.

The slider plate 104 includes first and second opposing sides 122, 124. A first flange 126 extends from the first side 122, and a second flange 128 extends from the second side 124. The first and second flanges 126, 128 extend at an angle (such as about 10-90 degrees) with respect to the respective first and second sides 122, 124 to form a respective first and second valleys 130, 132. For example, the first and second flanges 126, 128 and respective first and second sides 122, 124 for a substantially "V" type shape that corresponds to the "V" type shape formed in the main heat plate 102.

The slider plate 104 may also include one or more second openings or slits 134 in the elongated body (as best shown in FIG. 2). As illustrated, there are seven equally spaced openings 134 extending transversely or in a side to side direction proximal to a central top portion of the elongated body of the slider plate 104. It should be appreciated that the number and orientation of the second openings 134 corresponds to the number and orientation of the first openings 120 of the main heat plate 102. Further, the orientation and number of the openings 134 may be varied based on the application, in accordance with the orientation and number of the openings 120.

The slider plate 104 is adapted to be disposed on the main heat plate 102, with the first and second flanges 126, 128 disposed on the first and second flanges 112, 114. This allows the "V" type shape of the slider plate 104 to track and slide along the "V" type shape of the main heat plate 102. Further, the slider plate 104 is movable along the "V" type shape of the main heat plate 102 to open, close, or partially open and close the first openings 120 of the main heat plate 102.

For example, when direct heat is desired, the slider plate 104 is movable to align the openings 134 in the slider plate 104 with the openings 120 of the main heat plate 102. However, when indirect heat is desired, the slider plate 104 is movable to cover the openings 120 of the main heat plate 102. Additionally, the amount of direct heat and/or flame can be controlled by moving the slider plate 104 to partially align the openings 134 in the slider plate 104 with the openings 120 of the main heat plate 102. Described another way, the slider plate 104 may be moved to partially cover the openings 120 of the main heat plate 102.

The slider plate 104 also includes a hinged latch 136 coupled to the body of the slider plate 104 proximal to an end of the slider plate 104. The latch 136 is pivotable with respect to the body of the slider plate 104 via the hinge, and is adapted to couple the slider plate 104 to the control lever 106. For example, the latch 136 is movable between a closed or latched state that couples the slider plate 104 to the control lever 106, and an open or unlatched state that allows the slider plate 104 to be decoupled from the control lever 106. This allows for ease of assembly and disassembly, as well as replacement of the slider plate 104 and/or control lever 106.

Referring to FIG. 2, the control lever 106 includes a first shaft portion 138 with an engagement end 140 and a first bend 142 at an opposing end. The first bend 142 may be a substantially 90 degree bend, and a second shaft portion 144 may extend from the first bend 142 to a second bend 146. The second bend 146 may also be a substantially 90 degree bend, and a handle portion 148 may extend from the second bend 146. A grip or knob 150 may be disposed on an end of the handle portion 148.

Figure 3:
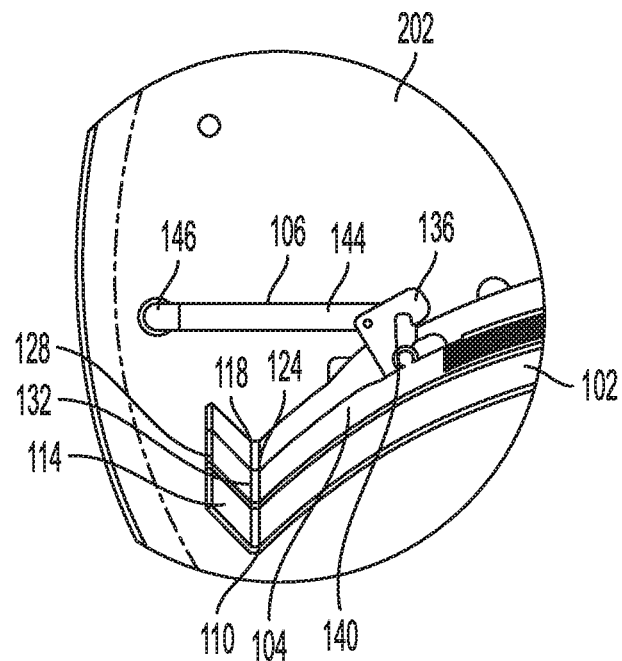
FIG. 3 is a partial enlarged view of a coupling of a control handle of the heat and flame control assembly according to at least one of the presently disclosed embodiments.
Figure 4:
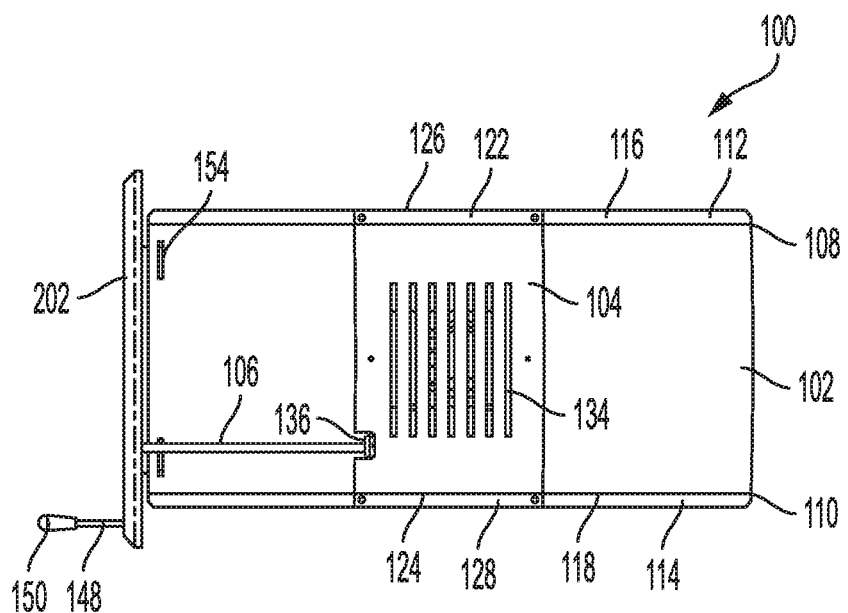
FIG. 4 is a top view of the heat and flame control assembly of FIG. 1.
Figure 6:
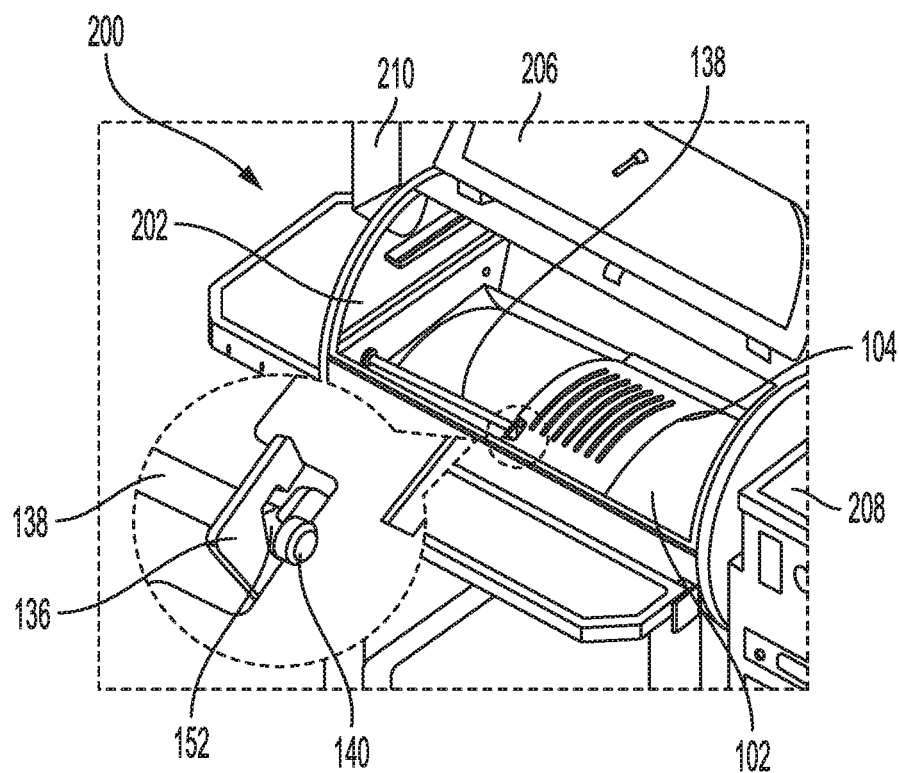
FIG. 6 is a perspective view of a heat and flame control assembly installed in a grill according to at least one of the presently disclosed embodiments.

Referring to FIGS. 3 and 6, the engagement end 140 and latch 136 can be adapted to couple the control lever 106 and the slider plate 104 together. For example, the latch may be disposed in the unlatched state, and the engagement end 140 disposed in the latch 136. The latch 136 may then be disposed in the latched state engaging and locking the engagement end 140 in the latch 136. This allows a position of the slider plate 104 to be moved with respect to the main heat plate 102, by a push and pull movement of the handle portion 148 of the control lever 106.

In some embodiments, the latch 136 and engagement end 140 may be interference or friction fit together when the latch 136 is in the latched state. Referring to FIG. 6, the engagement end 140 may include a recessed groove 152 that the latch 136 engages when the latch 136 is in the latched state. However, other coupling mechanisms may be used, such as fasteners, pins, etc.

The heat and flame control assembly 100 may be installed in an appliance, such as a grill, such as a grill 200 of the type illustrated in FIG. 6, having a cooking chamber (also referred to as a main barrel or main body) with an end 202. The cooking chamber may be coupled to a base having wheels. A burn pot 204 may be disposed in the cooking chamber proximal to a bottom of the cooking chamber. The heat and flame control assembly 100 is disposed in the cooking chamber above the burn pot, and one or more cooking grates may be disposed in the cooking chamber above the heat and flame control assembly 100, where food can be placed during a cooking operation. For example, meat or vegetables, can be cooked in either a grilling or smoking application. The cooking chamber can further include a door 206 that allows the user access to the cooking chamber so the user can retrieve or adjust food being cooked within the cooking chamber.

As shown in FIG. 6, the grill 200 can therefore include a hopper assembly 208 that receives pellets for operation. The hopper assembly 208 can include an auger that deposits the pellets into the burn pot 204. The pellets are ignited via combustion and produce heat and flames that cook food disposed on the cooking grates. The grill 200 can further include a chimney 210 for directing exiting smoke and heat in an upwardly direction so as to provide an outlet for air flow through the grill 200. The grill 200 can further include a grease tray for receiving grease or other external matter that is removed from the food inside the cooking chamber. The grease tray can also receive water or flavored liquids such as apple juice or cider, to provide additional moisture to the cooking chamber during use.

The temperature inside the cooking chamber can be adjusted and controlled by a controller on the hopper assembly that can be set by a user to control the internal temperature of the cooking chamber. For example, a user can set the cooking chamber to a temperature of 350 degrees, and the grill 200 will burn fuel or otherwise heat the cooking chamber until the temperature reaches 350 degrees based on a temperature sensor located within the cooking chamber. Once the temperature reaches 350 degrees, the controller will control the heating to reduce or eliminate the supply of heat temporarily. For example, and without limitation, the controller can then decrease the heat provided by reducing or preventing the supply of pellets to a burn pot.

Figure 5:
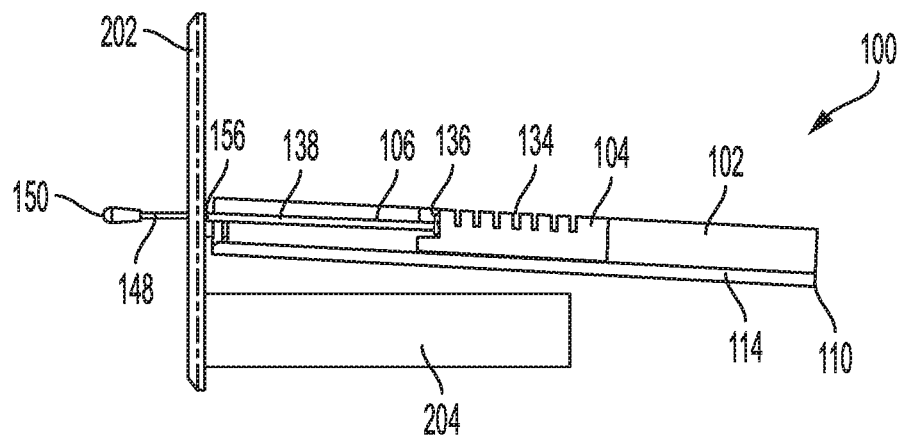
FIG. 5 is a side view of the heat and flame control assembly of FIG. 1.

Referring to FIGS. 1 and 5, the main heat plate 102 may be coupled to the side 202 of the grill. In an example, the main heat plate 102 may include one or more engagement apertures 154 adapted to engage a support disposed on the side 202 or in the cooking chamber of the grill 200. The slider plate 104 is disposed on the main heat plate 102, with the first and second flanges 126, 128 disposed on the first and second flanges 112, 114. This allows the "V" type shape of the slider plate 104 to track and slide along the "V" type shape of the main heat plate 102.

The handle portion 148 of the control lever 106 is disposed through an aperture in the side 202, with the second shaft portion 144 disposed proximal to an inside surface of the side 202, and the first shaft portion 138 extending internally to the cooking chamber. The grip or knob 150 is disposed on an external surface of the side 202, to allow a user to easily access the grip or knob 150. The engagement end 140 of the control lever 106 is also coupled to the latch 136.

During operation, the user may push or pull the control lever 106 via the grip or knob 150 to move or slide the slider plate 104 with respect to the main heat plate 104. As illustrated, when the grip or knob 150 is pulled away from the side 202, the slider plate 104 moves in a direction towards the side 202; and when the grip or knob 150 is pushed towards the side 202, the slider plate 104 moves in a direction away from the side 202. This movement of the slider plate 104 with respect to the main heat plate 102 changes an amount that the first openings 120 of the main heat plate 102 are open, closed, or partially open and closed.

In an example, when the grip or knob 150 is pulled away from the side 202, the slider plate 104 moves in a direction towards the side 202 and the openings 134 of the slider plate 104 align with the openings 120 of the main heat plate 102 to allow direct heat and flame from the burn pot 204 to emanate upwardly towards food disposed on a cooking grate. Additionally, when the grip or knob 150 is pulled away from the side 202, the second shaft portion 144 may act as a stop by contacting an internal surface of the side 202 to indicate that the openings 134 of the slider plate 104 are fully aligned with the openings 120 of the main heat plate 102.

Similarly, when the grip or knob 150 is pushed or moved towards the side 202, the slider plate 104 moves in a direction way from the side 202 and the slider plate 104 covers the openings 120 of the main heat plate 102 to provide indirect heat from the burn pot 204 to emanate upwardly towards food disposed on a cooking grate. As the grip or knob 150 is pushed or moved towards the side 202, a size of a gap 156 between the second shaft portion 144 and the internal surface of the side 202 increases. Additionally, when the grip or knob 150 is pushed or moved towards the side 202, the grip or knob 150 may act as a stop by contacting an external surface of the side 202 to indicate that the openings 120 of the main heat plate 102 are closed or covered by the slider plate 104.

The openings 120 of the main heat plate 102 may also be partially covered by the slider plate 104 to control the amount of direct heat. The more the openings 120 are covered, the less amount of direct heat provided. Accordingly, a user can control the amount of direct and indirect heat in the cooking chamber by moving the control lever, thereby changing an alignment between the openings 134 of the slider plate 104 and the openings 120 of the main heat plate 102.

While it is described that the openings 134 of the slider plate 104 are fully aligned with the openings 120 of the main heat plate 102 when the grip or knob 150 is pulled away from the side 202, and the shaft portion 144 contacts the internal surface of the side 202, the operation may be reversed. For example, the slider plate 104 may cover the openings 120 of the main heat plate 102 when the grip or knob 150 is pulled away from the side 202, and the shaft portion 144 contacts the internal surface of the side 202.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A heat and flame control assembly, comprising:
   a main heat plate including first openings and adapted to be disposed above a burn pot of an appliance;
   a slider plate disposed on the main heat plate and adapted to be moved with respect to the main heat plate to open and close the first openings;
   a latch coupled to the slider plate and pivotable between latched and unlatched positions; and
   a control lever having a first end and a second end opposite the first end, the first end including a knob and the second end including an engagement portion coupleable with the latch so as to couple the control lever to the slider plate by the latch when the latch is disposed in the latched position, and to permit decoupling of the control lever from the latch when the latch is disposed in the unlatched position, wherein movement of the control lever moves the slider plate with respect to the main heat plate to open and close the first openings, and wherein the engagement end includes a recessed groove engaged within the latch in the latched position, the latch being a plate that pivots out of engagement with the recessed groove to cause the latch to be disposed in the unlatched position, and that pivots into engagement with the recessed groove to cause the latch to be disposed in the latched position.

2. The heat and flame control assembly of claim 1, wherein the slider plate includes second openings that align with the first openings to open the first openings.

3. The heat and flame control assembly of claim 1, wherein the control lever includes a stop portion adapted to abut an internal surface of the appliance when the control lever is moved away from the appliance.

4. The heat and flame control assembly of claim 3, wherein the slider plate includes second openings that align with the first openings to open the first openings, when the stop portion abuts the internal surface.

5. The heat and flame control assembly of claim 1, wherein the control lever includes a stop portion adapted to abut an external surface of the appliance when the control lever is moved towards the appliance.

6. The heat and flame control assembly of claim 5, wherein the slider plate covers the first openings to close the first openings, when the stop portion abuts the external surface.

7. An appliance, comprising:
   a cooking chamber with a side;
   a burn pot disposed in the cooking chamber;
   a main heat plate including first openings, the main heat plate is disposed in the cooking chamber above the burn pot;
   a slider plate disposed on the main heat plate and adapted to be moved with respect to the main heat plate to open and close the first openings;
   a latch coupled to the slider plate and movable between latched and unlatched positions; and
   a control lever having a first end and a second end opposite the first end, the first end including a knob and the second end including an engagement portion coupleable with the latch so as to couple the control lever to the slider plate by the latch when the latch is disposed in the latched position, and to permit decoupling of the control lever from the latch when the latch is disposed in the unlatched position, the second end extending through the side of the cooking chamber, wherein movement of the control lever moves the slider plate with respect to the main heat plate to open and close the first openings, and wherein the engagement end includes a recessed groove engaged within the latch in the latched position, the latch being a plate that pivots out of engagement with the recessed groove to cause the latch to be disposed in the unlatched position, and that pivots into engagement with the recessed groove to cause the latch to be disposed in the latched position.

8. The appliance of claim 7, wherein the slider plate includes second openings that align with the first openings to open the first openings.

9. The appliance of claim 7, wherein the control lever includes a stop portion adapted to abut an internal surface of the side when the control lever is moved away from the side.

10. The appliance of claim 9, wherein the slider plate includes second openings that align with the first openings to open the first openings, when the stop portion abuts the internal surface.

11. The appliance of claim 7, wherein the control lever includes a stop portion adapted to abut an external surface of the side when the control lever is moved towards the side.

12. The appliance of claim 11, wherein the slider plate covers the first openings to close the first openings, when the stop portion abuts the external surface.

13. The appliance of claim 7, further comprising a cooking grate disposed in the cooking chamber above the slider plate.

14. The appliance of claim 7, further comprising a hopper assembly adapted to supply fuel to the burn pot.

15. An appliance, comprising:
   a cooking chamber with a side;
   a burn pot disposed in the cooking chamber;
   a main heat plate including a plurality of first openings, the main heat plate being disposed in the cooking chamber above the burn pot;
   a slider plate disposed on the main heat plate and adapted to slide against the main heat plate to cover or expose the first openings;
   a latch coupled to the slider plate and movable between latched and unlatched positions; and
   a control lever having a first end and a second end opposite the first end, the first end including a knob and the second end including an engagement portion coupleable with the latch so as to couple the control lever to the slider plate by the latch when the latch is disposed in the closed position, and to permit decoupling of the control lever from the latch when the latch is disposed in the open position, the second end extending through the side of the cooking chamber, wherein movement of the control lever moves the slider plate with respect to the main heat plate to align the first and second openings or to close the first openings with the main heat plate, and wherein the engagement end includes a recessed groove engaged within the latch in the closed position, the latch being a plate that pivots out of engagement with the recessed groove to cause the latch to be disposed in the unlatched position, and that pivots into engagement with the recessed groove to cause the latch to be disposed in the latched position.

* * * * *